(12) United States Patent
Short et al.

(10) Patent No.: US 10,168,833 B2
(45) Date of Patent: Jan. 1, 2019

(54) PRESENTATION OF A DIGITAL IMAGE OF AN OBJECT

(71) Applicant: Hewlett-Packard Development Company, L.P., Houston, TX (US)

(72) Inventors: David Bradley Short, San Diego, CA (US); Jinman Kang, San Diego, CA (US); Ruth Ann Lim, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/508,373

(22) PCT Filed: Sep. 3, 2014

(86) PCT No.: PCT/US2014/053801
§ 371 (c)(1),
(2) Date: Mar. 2, 2017

(87) PCT Pub. No.: WO2016/036352
PCT Pub. Date: Mar. 10, 2016

(65) Prior Publication Data
US 2017/0308241 A1    Oct. 26, 2017

(51) Int. Cl.
| | | |
|---|---|---|
| *G06F 3/033* | (2013.01) |
| *G06F 3/041* | (2006.01) |
| *G06F 3/00* | (2006.01) |
| *G06F 3/03* | (2006.01) |
| *G06F 3/042* | (2006.01) |
| *H04N 9/31* | (2006.01) |

(52) U.S. Cl.
CPC ............ *G06F 3/0418* (2013.01); *G06F 3/005* (2013.01); *G06F 3/0304* (2013.01); *G06F 3/0425* (2013.01); *H04N 9/3185* (2013.01); *H04N 9/3194* (2013.01)

(58) Field of Classification Search
CPC ..... G01B 11/002; G01B 11/24; G06F 3/0418; G06F 3/0425; G06T 7/593; H04N 9/3185; H04N 13/025; H04N 13/0246; H04N 2213/003; H04N 2213/0081; H04N 9/3194
See application file for complete search history.

(56) References Cited

U.S. PATENT DOCUMENTS 5,687,305 A * 11/1997 Graham .................. G06T 3/005
                                                        345/420
7,181,363 B2    2/2007 Ratti et al.
(Continued)

OTHER PUBLICATIONS

Alvin J. Law et al., "Projecting Restorations in Real-time for Real-world Objects," Apr. 21, 2009, pp. 1-8, cs.purdue.edu.
(Continued)

*Primary Examiner* — Michael J Eurice
(74) *Attorney, Agent, or Firm* — HP Inc. Patent Department (57) ABSTRACT

An example method is provided for. The method comprises receiving an image of an object on a surface, detecting features of the object, and presenting the image on the surface based on the features of the object. The features include location and dimensions, wherein dimensions of the image match the dimensions of the object and location of the image overlap with the location of the object on the surface.

17 Claims, 6 Drawing Sheets

(56) References Cited

U.S. PATENT DOCUMENTS

| | | |
|---|---|---|
| 7,599,561 B2 | 10/2009 | Wilson et al. |
| 7,710,391 B2 | 5/2010 | Bell et al. |
| 8,018,579 B1* | 9/2011 | Krah .................. G01B 11/00 356/4.01 |
| 8,118,438 B2 | 2/2012 | Daniel et al. |
| 8,121,640 B2 | 2/2012 | Russ et al. |
| 8,199,117 B2 | 6/2012 | Izadi et al. |
| 8,411,931 B2 | 4/2013 | Zhou et al. |
| 8,736,583 B2 | 5/2014 | Anderson et al. |
| 8,947,351 B1* | 2/2015 | Noble .................. G06F 3/0488 345/156 |
| 2004/0128012 A1* | 7/2004 | Lin .................. G06F 3/011 700/100 |
| 2005/0017967 A1* | 1/2005 | Ratti .................. G06F 3/0425 345/418 |
| 2005/0078092 A1* | 4/2005 | Clapper .................. G06F 1/1601 345/173 |
| 2005/0110964 A1* | 5/2005 | Bell .................. G06F 3/011 353/122 |
| 2007/0201863 A1* | 8/2007 | Wilson .................. G03B 29/00 396/429 |
| 2007/0211023 A1* | 9/2007 | Boillot .................. G06F 3/017 345/156 |
| 2008/0018591 A1* | 1/2008 | Pittel .................. G06F 1/1616 345/156 |
| 2008/0281851 A1* | 11/2008 | Izadi .................. G06F 17/30056 |
| 2009/0116732 A1* | 5/2009 | Zhou .................. H04N 13/026 382/154 |
| 2009/0271691 A1* | 10/2009 | Brush .................. G06F 17/30011 715/201 |
| 2010/0169818 A1* | 7/2010 | Hughes .................. G06F 3/0481 715/773 |
| 2010/0240390 A1* | 9/2010 | Russ .................. H04M 1/0256 455/456.1 |
| 2011/0001935 A1* | 1/2011 | Reale .................. G03B 21/14 353/28 |
| 2011/0019155 A1* | 1/2011 | Daniel .................. G03B 21/26 353/28 |
| 2011/0058023 A1* | 3/2011 | Boles .................. G01B 11/2513 348/46 |
| 2011/0074697 A1* | 3/2011 | Rapp .................. G06F 3/0481 345/173 |
| 2011/0242054 A1* | 10/2011 | Tsu .................. G06F 3/0425 345/175 |
| 2011/0267478 A1* | 11/2011 | Jacobs .................. G06F 1/1616 348/207.11 |
| 2011/0276731 A1* | 11/2011 | Liu .................. G06F 5/10 710/52 |
| 2012/0038739 A1* | 2/2012 | Welch .................. G06T 15/04 348/14.01 |
| 2012/0154695 A1* | 6/2012 | LaDuke .................. G03B 21/14 348/745 |
| 2012/0249443 A1* | 10/2012 | Anderson .................. A63F 13/06 345/173 |
| 2012/0314030 A1* | 12/2012 | Datta .................. G06K 9/00771 348/44 |
| 2013/0077236 A1* | 3/2013 | Becze .................. G06F 3/1438 361/679.56 |
| 2013/0321271 A1* | 12/2013 | Bychkov .................. G06F 3/013 345/158 |
| 2014/0298266 A1* | 10/2014 | Lapp .................. G06F 3/04883 715/835 |
| 2015/0054735 A1* | 2/2015 | Nakama .................. G06F 3/0325 345/156 |
| 2015/0084937 A1* | 3/2015 | Takatsuka .................. G06F 1/1626 345/179 |
| 2015/0187143 A1* | 7/2015 | Mere .................. G06F 3/017 345/156 |
| 2017/0223338 A1* | 8/2017 | Kang .................. G09G 5/006 |

OTHER PUBLICATIONS

Shahram Izadi et al., "C-Slate: A Multi-Touch and Object Recognition System for Remote Collaboration using Horizontal Surfaces," 2007, pp. 3-10, IEEE.

* cited by examiner

PRESENTATION OF A DIGITAL IMAGE OF AN OBJECT

BACKGROUND

A capture system may be used to digitally capture images of documents and other objects and in an effort to improve the interactive user experience working with real objects and projected objects on a physical work surface. Further, a visual sensor is a sensor that can capture visual data associated with a target. The visual data can include an image of the target or a video of the target. A cluster of heterogeneous visual sensors (different types of visual sensors) can be used for certain applications. Visual data collected by the heterogeneous sensors can be combined and processed to perform a task associated with the respective application.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein the term "approximately means plus or minus 10%. In addition, as used herein, the phrase "user input device" refers to any suitable device for providing an input, by a user, into an electrical system such as, for example, a mouse, keyboard, a hand (or any finger thereof), a stylus, a pointing device, etc.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

Aspects of the present disclosure described herein disclose a projection capture system, which includes a digital camera and a projector that are housed together in a device. The projector functions both to illuminate objects in the camera in a capture area for image capture and to project and/or display digital images captured by the camera of those objects into a display area that overlaps the capture area. For example, a projector projects an object's digital image in the same size (e.g., 1-to-1 ratio) as the object and in the same location as the object. Among other things, this approach allows automatic presentation of the digital image of the object without requiring a user's manual intervention.

In one example in accordance with the present disclosure, a method for presenting a digital image of an object is provided. The method comprises receiving an image of an object on a surface, detecting features of the object, the features including location and dimensions, and presenting the image on the surface based on the features of the object, wherein dimensions of the image match the dimensions of the object, and location of the image overlap with the location of the object on the surface.

In another example in accordance with the present disclosure, a system is provided. The system comprises a camera to capture a digital image of an object positioned in a location within a field of view of the camera, and a projector unit, communicatively coupled to the camera, to project the digital image in the location of the object, wherein size of the digital image match size of the object.

In a further example in accordance with the present disclosure, a non-transitory computer readable medium is provided. The non-transitory computer-readable medium comprises instructions which, when executed, cause a device to (i) calibrate a camera with respect to a projector unit, (ii) receive an image of an object positioned in a location within a field of view of the camera, and (iii) provide the image to be presented in the location of the object, wherein size of the image is same as the object.

Referring now to FIGS. 1-4, a computer system 100 in accordance with the principles disclosed herein is shown. In this example, system 100 generally comprises a support structure 110, a computing device 150, a projector unit 180, and a touch sensitive mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computer's board), or some combination thereof. In this example, device 150 is an all-in-one computer that includes a central axis or center line 155, first or top side 150a, a second or bottom side 150b axially opposite the top side 150a, a front side 150c extending axially between the sides 150a, 150b, a rear side also extending axially between the sides 150a, 150b and generally radially opposite the front side 150c. A display 152 defines a viewing surface and is disposed along the front side 150c to project images for viewing and interaction by a user (not shown). In some examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive surface or display. In addition, in some examples, device 150 further includes a camera 154 that is to take images of a user while he or she is positioned in front of display 152. In some implementations, camera 154 is a web camera. Further, in some examples, device 150 also includes a microphone or similar device that is arranged to receive sound inputs (e.g., voice) from a user during operation.

Referring still to FIGS. 1-4, support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignments methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b. The lower end 140b of member 140 is coupled to the rear end 120b of base 120, such that member 140 extends substantially upward from the support surface 15.

Top 160 includes a first or proximate end 160a, a second or distal end 160b opposite the proximate end 160a, a top surface 160c extending between the ends 160a, 160b, and a bottom surface 160d opposite the top surface 160c and also extending between the ends 160a, 160b. Proximate end 160a of top 160 is coupled to upper end 140a of upright member 140 such that distal end 160b extends outward therefrom. As a result, in the example shown in FIG. 2, top 160 is supported only at end 160a and thus is referred to herein as a "cantilevered" top. In some examples, base 120, member 140, and top 160 are all monolithically formed; however, it should be appreciated that in other example, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202 is disposed on mat 200 and is substantially aligned with the axis 205. Surface 202 may comprise any suitable touch sensitive technology for detecting and tracking one or multiple touch inputs by a user in order to allow the user to interact with software being executed by device 150 or some other computing device (not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over only a portion of mat 200; however, it should be appreciated that in other examples, surface 202 may extend over substantially all of mat 200 while still complying with the principles disclosed herein.

During operation, mat 200 is aligned with base 120 of structure 110, as previously described to ensure proper alignment thereof. In particular, in this example, rear side 200b of mat 200 is placed between the raised portion 122 of base 120 and support surface 15 such that rear end 200b is aligned with front side 120a of base, thereby ensuring proper overall alignment of mat 200, and particularly surface 202, with other components within system 100. In some examples, mat 200 is aligned with device 150 such that the center line 155 of device 150 is substantially aligned with center line 205 of mat 200; however, other alignments are possible. In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as, for example, WI-FI, BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

Figure 1:
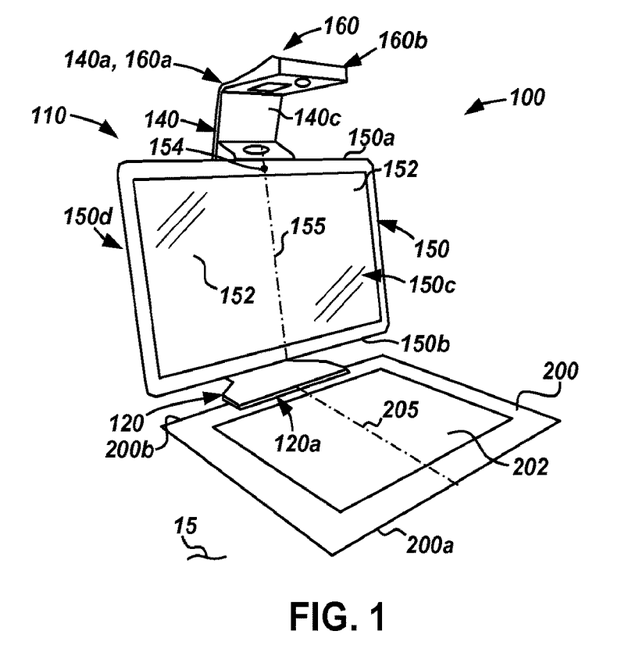
FIG. 1 is a schematic perspective view of an example of a computer system in accordance with the principles disclosed herein.
Figure 2:
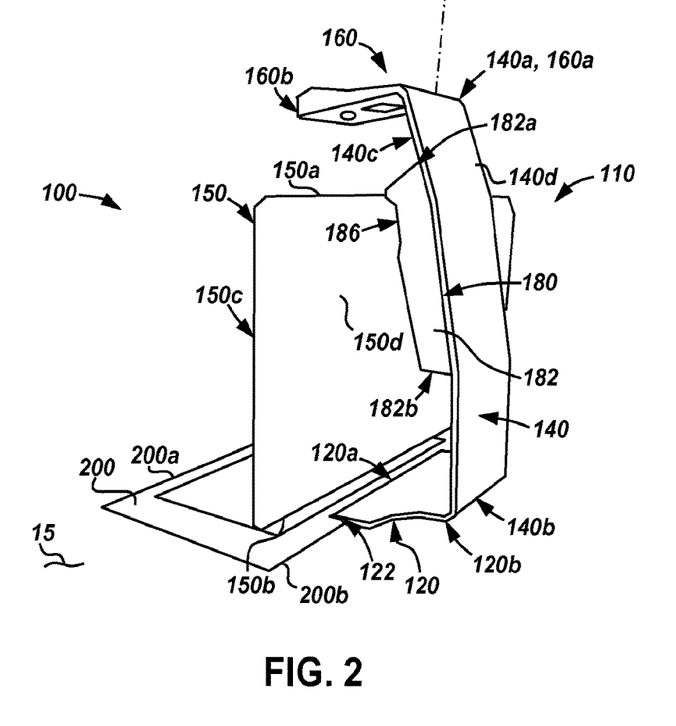
FIG. 2 is another schematic perspective view of the computer system of FIG. 1 in accordance with the principles disclosed herein.
Figure 3:
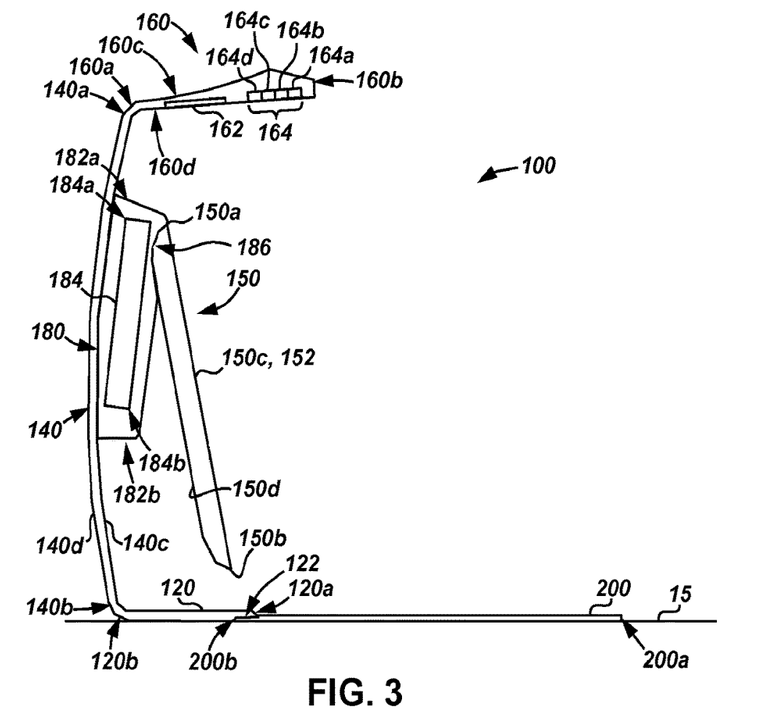
FIG. 3 is a schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this embodiment, housing 182 further includes a coupling or mounting member 186 to engage with and support device 150 during operations. In general member 186 may be any suitable member or device for suspending and supporting a computer device (e.g., device 150) while still complying with the principles disclosed herein. For example, in some implementations, member 186 comprises hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 180 and device 150 are integrally and/or monolithically formed as a single unit.

Figure 4:
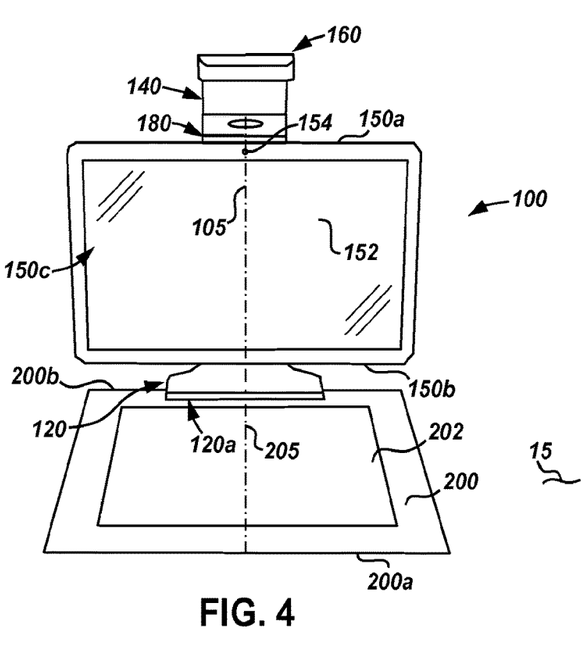
FIG. 4 is a schematic front view of the computer system of FIG. 1 in accordance with the principles disclosed herein.

Thus, referring briefly to FIG. 4, when device 150 is suspended from structure 110 through the mounting member 186 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DLP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. Projector assembly 184 is further electrically coupled to device 150 in order to receive data therefrom for producing light and images from end 184a during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLUETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162a that is disposed along bottom surface 160d of top 160 and is positioned to reflect images and/or light projected from upper end 184a of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200. In other examples, mirror 162 could have a complex aspherical curvature to act as a reflective lens element to provide additional focusing power or optical correction.

Sensor bundle 164 includes a plurality of sensors and/or cameras to measure and/or detect various parameters occurring on or near mat 200 during operation. For example, in the specific implementation depicted in FIG. 3, bundle 164 includes an ambient light sensor 164a, a camera (e.g., a color camera) 164b, a depth sensor or camera 164c, and a three dimensional (3D) user interface sensor 164d. Each sensor may have a different resolution and field of view. In one example, each of these sensors may be aimed at the horizontal touch sensitive mat 200 and touch sensitive surface 202 (e.g., screen for the projector). Accordingly, the field of views of these sensors may overlap.

Examples of applications in which sensor bundle 164 can be used include object detection, object tracking, object recognition, object classification, object segmentation, object capture and reconstruction, optical touch, augmented reality presentation, or other applications. Object detection can refer to detecting presence of an object in captured visual data, which can include an image or video. Object tracking can refer to tracking movement of the object. Object recognition can refer to identifying a particular object, such as identifying a type of the object, identifying a person, and so forth. Object classification can refer to classifying an object into one of multiple classes or categories. Object segmentation can refer to segmenting an object into multiple segments. Object capture and construction can refer to capturing visual data of an object and constructing a model of the object. Optical touch can refer to recognizing gestures made by a user's hand, a stylus, or other physical artifact that are intended to provide input to a system. The gestures are analogous to gestures corresponding to movement of a mouse device or gestures made on a touch-sensitive display panel. However, optical touch allows the gestures to be made in three-dimensional (3D) space or on a physical target that is not configured to detect user input.

Augmented reality presentation can refer to a presentation of a physical, real-world environment that is augmented by additional information, including audio data, video data, image data, text data, and so forth. In augmented reality, the visual sensor (or a cluster of visual sensors) can capture visual data of a physical target. In response to recognition of the captured physical target an augmented reality presentation can be produced. For example, the physical target can be a picture in a newspaper or magazine, and the capture of the picture can cause an online electronic game to start playing. The given picture in the newspaper or magazine can be a game character, an advertisement, or other information associated with the online electronic game. The augmented reality presentation that is triggered can include the visual data of the captured physical target, as well as other data (e.g. game environment) surrounding the captured visual data.

Ambient light sensor 164a is arranged to measure the intensity of light of the environment surrounding system 100, in order to, in some implementations, adjust the camera's and/or sensor's (e.g., sensors 164a, 164b, 164c, 164d) exposure settings, and/or adjust the intensity of the light emitted from other sources throughout system such as, for example, projector assembly 184, display 152, etc. Camera 164b may, in some instances, comprise a color camera which is arranged to take either a still image or a video of an object and/or document disposed on mat 200. In one implementation, camera 164b and projector 184 are operatively connected to a controller for camera 164b capturing an image of an object in mat 200 and projector 184 projecting the object image into mat 200 and, in some examples, for camera 164b capturing an image of the projected object image. The controller is programmed to generate and projector may project a user control panel, including device control "buttons" such as Capture button and Undo, Fix, and OK buttons. In another implementation, the control panel may be embedded in mat 200.

In one implementation, the object can be a two dimensional object (e.g., a hardcopy photograph). In another implementation, the object can be a three dimensional object (e.g., a cube). The object may be placed onto mat 200, and an image of the object mat be captured by camera 164b (and/or other cameras present in system 100). Further, a digital image of the object may be projected onto mat 200 in the exact location of the object, and the digital image may have the exact size of the object. Accordingly, when the object is removed to the side of mat 200, the image projected onto mat 200 is shown provides a digital version of the object in the exact same location (e.g., as if the object is still on mat 200).

Depth sensor 164c generally indicates when a 3D object is on the work surface. In particular, depth sensor 164c may sense or detect the presence, shape, contours, motion, and/or the 3D depth of an object (or specific feature(s) of an object) placed on mat 200 during operation. Depth camera 164c may be relatively robust against effects due to lighting change, presence of a shadow, or dynamic background produced by a projector. The output information from the depth sensor 164c may be three-dimensional (3D) depth information (also referred to as a "depth map"), infrared (IR) image frames and red-green-blue (RGB) image frames. An "image frame" refers to a collection of visual data points that make up an image. Depth information refers to a depth of the physical target with respect to the depth camera; this depth information represents the distance between the physical target (or a portion of the physical target) and the depth camera. The depth and IR sensors may be used to aid segmentation of 2D objects that appear close in RGB color (e.g. white on white) to capture mat surface 200. The 2D object may not appear different than mat 200 in visual light frequencies but may have different reflectivity in the IR wavelengths and thus able to assist segmentation so long as pixels in one sensor image are known to correspond to pixels in the other sensor's image. If the depth sensor detects differences in the object height relative to the mat height, the analysis of its image can aid foreground/background segmentation using a transformation of the pixels from the depth image into the RGB image.

Thus, in some implementations, sensor 164c may employ any suitable sensor or camera arrangement to sense and detect a 3D object and/or the depth values of each pixel (whether infrared, color, or other) disposed in the sensor's field-of-view (FOV). For example, in some implementations sensor 164c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. In some implementations, depth sensor 164c may be used as a reference sensor for aligning all other sensors and projector, which will be discussed in more detail below.

User interface sensor 164d includes any suitable device or devices (e.g., sensor or camera) for tracking a user input device such as, for example, a hand, stylus, pointing device, etc. In some implementations, sensor 164d includes a pair of cameras which are arranged to stereoscopically track the location of a user input device (e.g., a stylus) as it is moved by a user about the mat 200, and particularly about surface 202 of mat 200. In other examples, sensor 164d may also or alternatively include an infrared camera(s) or sensor(s) that is arranged to detect infrared light that is either emitted or reflected by a user input device. Accordingly, the output information from sensor 164d may be 3D coordinates (i.e., x, y and z) of detected features (e.g., finger, stylus and tool).

It should further be appreciated that bundle 164 may comprise other sensors and/or cameras either in lieu of or in addition to sensors 164a, 164b, 164c, 164d, previously described. In addition, as will explained in more detail below, each of the sensors 164a, 164b, 164c, 164d within bundle 164 is electrically and communicatively coupled to device 150 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLUETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

Figure 5:
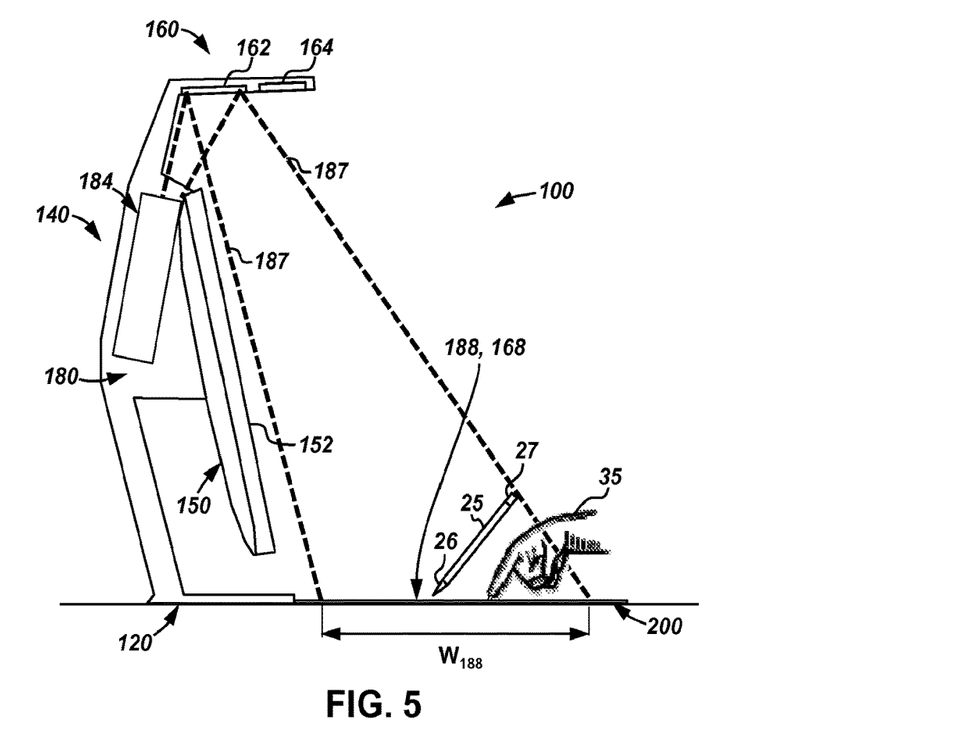
FIG. 5 is a schematic side view of the computer system of FIG. 1 during operation in accordance with the principles disclosed herein.
Figure 6:
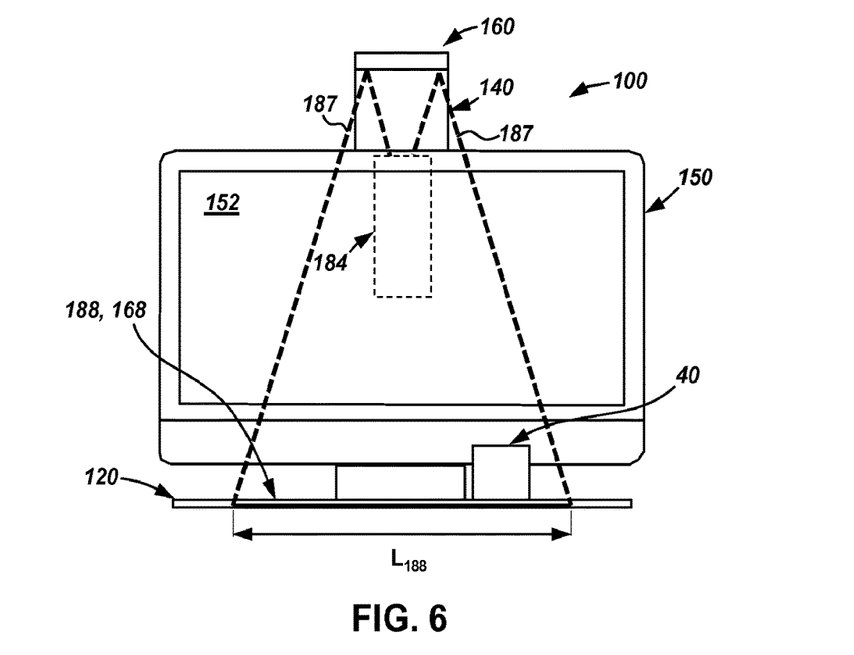
FIG. 6 is a schematic front view of the system of FIG. 1 during operation in accordance with the principles disclosed herein.

Referring now to FIGS. 5 and 6, during operation of system 100, light 187 is emitted from projector assembly 184, and reflected off of mirror 162 towards mat 200 thereby displaying an image on a projector display space 188. In this example, space 188 is substantially rectangular and is defined by a length $L_{188}$ and a width $W_{188}$. In some examples length $L_{188}$ may equal approximately 16 inches, while width $W_{188}$ may equal approximately 12 inches; however, it should be appreciated that other values for both length $L_{188}$ and width $W_{188}$ may be used while still complying with the principles disclosed herein. In addition, the sensors (e.g., sensors 164a, 164b, 164c, 164d) within bundle 164 include a sensed space 168 that, in at least some examples, overlaps and/or corresponds with projector display space 188, previously described. Space 168 defines the area that the sensors within bundle 164 are arranged to monitor and/or detect the conditions thereof in the manner previously described. In some examples, both space 188 and space 168 coincide or correspond with surface 202 of mat 200, previously described, to effectively integrate the functionality of the touch sensitive surface 202, projector assembly 184, and sensor bundle 164 within a defined area.

As a result, in some examples, the image projected onto surface 202 by assembly 184 serves as a second or alternative touch sensitive display within system 100. In addition, interaction with the image displayed on surface 202 is further enhanced through use of the sensors (e.g., sensors 164a, 164b, 164c, 164d) disposed within bundle 164 as described above.

Referring still to FIGS. 5-6, in addition, during operation of at least some examples, system 100 may capture a two dimensional (2D) image or create a 3D scan of a physical object such that an image of the object may then be projected onto the surface 202 in the same location as the physical object and having the same size as the physical object for further use and manipulation thereof. In particular, in some examples, an object 40 may be placed on surface 202 such that sensors (e.g., camera 164b, depth sensor 164c, etc.) within bundle 164 may detect, for instance, the location, dimensions, and in some instances, the color of object 40, to enhance a 2D image or create a 3D scan thereof based on the detected information. The information gathered by the sensors (e.g., sensors 164b, 164c) within bundle 164 may then be routed to processor of device 150, which is described in more detail in reference to FIG. 10. Thereafter, the processor directs projector assembly 184 to project an image of object 40 onto the surface 202 in the same location as object 40, and with the same dimensions as object 40. It should also be appreciated that in some examples, other objects such as documents or photos may also be scanned by sensors within bundle 164 in order to generate an image thereof which is projected onto surface 202 with assembly 184. In addition, in some examples, once an object(s) is scanned by sensors within bundle 164, the background of the image may be optionally, digitally removed within the resulting image projected onto surface 202 (or shown on display 152 of device 150). Thus, in some examples, images of physical objects (e.g., object 40) may be captured, digitized, and displayed on surface 202 during operation to quickly and easily create a digital version of a physical object to allow for further manipulation thereof consistent with the manner described herein.

In other implementation, the work surface may be different than a mat (e.g., mat 200). For example, work surface may be part of the desktop or other underlying support structure. In another example, the work surface may be a display screen, including an LCD display. In such example, instead of projecting the image of the object, system 100 may display the digital image of the object on the display screen.

Figure 7:
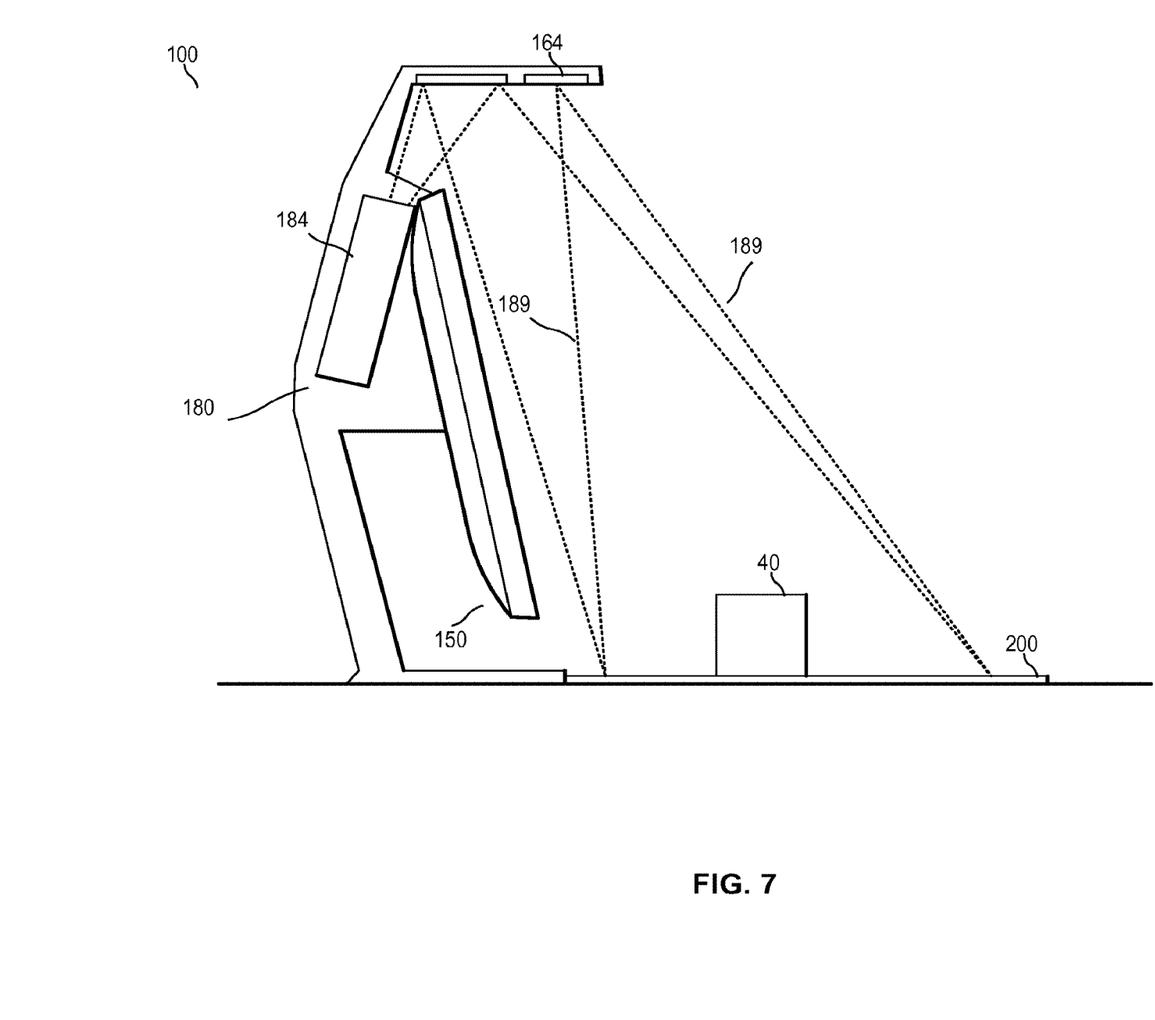
FIG. 7 is a schematic side view of the computer system of FIG. 1 during operation in accordance with the principles disclosed herein.

FIG. 7 illustrates an example of system 100 with an object on mat 200. As discussed earlier in FIGS. 1-6, system 100 includes camera 164*b* for capturing still and video images of object 40 in capture area (defined by the boundaries 189) and projector 184 for illuminating the object in capture area and for projecting images onto the object (e.g., the same physical location as the object). For example, object 40 may be a three dimensional object (e.g., a cube) placed in capture area has been photographed by camera 164*b* and a digital image of object 40 is projected onto the object, where the digital image has the same dimensions as object 40. Accordingly, when object 40 is removed from the capture area, the object image is shown projected in the same physical location.

In the system illustrated in FIG. 7, bundle 164 is calibrated in order for all the sensors to work together. In addition, sensors 164*a*, 164*b*, 164*c*, 164*d* may all need to be aligned with projector unit 180 to project the image of object 40 on top of object 40 on mat 200 and in the same dimensions as object 40. If bundle 164 and projector unit 180 are not properly calibrated, then combining the visual data collected by the sensors (e.g., sensors 164*a*, 164*b*, 164*c*, 164*d*) may not provide accurate results. In accordance with some implementation, calibration mechanisms or techniques are provided to calibrate sensors that are part of bundle 164. Such alignment provides communication between all these components. More specifically, the alignment provides propagating information across different sensors and projecting information from all sensors for further processing in the various applications of system 100. For the alignment to be achieved, a common coordinate system may need to be established. More specifically, when one sensor locates an object (e.g., object 40) within the field of view, the other sensors and projector unit 180 may identify the location of such object in their own coordinate systems.

In one implementation, system 100 may include a program for verifying alignment of the components within system 100 with respect to each other. The program may be initiated by software executing within device 150. As an example, the program may verify whether sensor bundle 164 is calibrated properly with respect to the projector assembly 184, as will be further described. As an example, the verification program may be executed regularly (e.g., once a week), at power up of system 100. If misalignment of components within system 100 is detected, calibration operations may be performed.

As an example, alignment of the components within system 100 may be verified based according to mapping methods, such as homography. Such methods may involve mapping information, which is used to perform calibration among the sensors of bundle 164 in addition to calibration with projector assembly 184. A homography mapping is a 3D-to-2D mapping, and maps between three dimension (3D) coordinates (of the depth sensor 164*c*) and two dimensional (2D) coordinates (of another sensor in bundle 164). For example, a 3D homography mapping may be derived for the direct mapping between depth sensor 164*c* and gesture sensor 164*d* in sensor bundle 164. In another example, a projective mapping can be defined between the 3D coordinates of depth sensor 164*c* and the 2D coordinates of projector assembly 184. In particular, the 3D mapping between two sensors may include scale, rotation, translation and depth invariant.

In one example, a common coordinate system may be used based on physical real world coordinates based on a visible origin point that is visible in the field of view of at least one of the plurality of sensors. For example, a common coordinate system that shares a perspective transformation with the at least one of the plurality of sensors may be identified. This process may be re-iterated for each other pair of visual sensors in 164 to provide a direct 3D-to-2D mapping between each other pair of sensors in bundle 164. As a result of the calibration process (e.g., using a common coordinate system, resulting in the same resolution and image aspect ratio across all the sensors and projector), the projected outlines match up with physical locations of object 40.

As noted above, a projective mapping can be defined between the 3D coordinates of depth sensor 164*c* and the 2D coordinates of projector assembly 184. Projector assembly 184 may be used to project a calibration pattern (which is a known or predefined pattern) onto the projection surface 202. In one implementation, the calibration pattern may be projected onto a white flat surface object to make the projected content visible. In some examples, the object can be a plane that is in 3D space. The calibration pattern may be a checkerboard pattern. Depth sensor 164*c* may capture a calibration pattern image that is projected onto the object by projector assembly 184. The visual data (of the projected calibration pattern image) captured by depth sensor 164*c* is in a 3D space (defined by 3D coordinate), while the calibration pattern projected by projector assembly 184 is in 2D space (defined by 2D coordinates).

It should also be appreciated that in some examples, other objects such as documents or photos (e.g., 2D objects) may also be scanned by sensors within bundle 164 in order to generate an image thereof which is projected onto surface 202 with assembly 184. In addition, in some examples, once an object(s) is scanned by sensors within bundle 164, the background of the image may be optionally, digitally removed within the resulting image projected onto surface 202 (or shown on display 152 of device 150). Thus, in some examples, images of physical objects (e.g., object 40) may be captured, digitized, and displayed on surface 202 during operation to quickly and easily create a digital version of a physical object to allow for further manipulation thereof consistent with the manner described herein. Further, as noted earlier, the location of the projected image matches up with physical location of object 40, and the size of the projected image matches up with physical dimensions of object 40.

Computing device 150 may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, a DVD, etc.), and the like, or a combination thereof. Further, any machine-readable storage medium described herein may be non-transitory.

Figure 8:
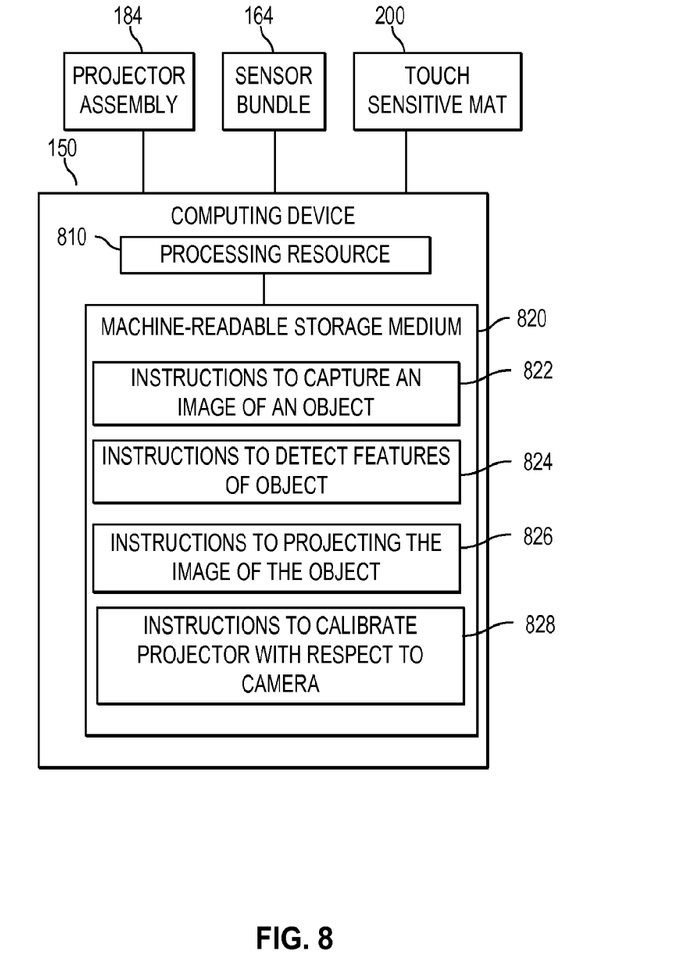
FIG. 8 is a block diagram depicting a memory resource and a processing resource in accordance with the principles disclosed herein.

FIG. 8 is a block diagram of an example computing device 150. In the example of FIG. 8, computing device 150 is communicatively connected to projector assembly 184, sensor bundle 164, and touch sensitive mat 200 (as described above), and includes a processing resource 810, and a machine-readable storage medium 1020 comprising (e.g., encoded with) instructions 822, 824, and 826. In some examples, storage medium 820 may include additional instructions. In other examples, instructions 822, 824, 826, and any other instructions described herein in relation to storage medium 820, may be stored on a machine-readable storage medium remote from but accessible to computing device 150 and processing resource 810. Processing resource 810 may fetch, decode, and execute instructions stored on storage medium 820 to implement the functionalities described below. In other examples, the functionalities of any of the instructions of storage medium 820 may be implemented in the form of electronic circuitry, in the form of executable instructions encoded on a machine-readable storage medium, or a combination thereof. Machine-readable storage medium 820 may be a non-transitory machine-readable storage medium.

In the example of FIG. 8, a computing system, such as computing system 100 described above in relation to FIG. 1, may comprise computing device 150, projector assembly 184, sensor bundle 164, and touch sensitive mat 200. In some examples, instructions 822 may include instructions for capturing an image of an object. Instructions 824 may include instructions for detecting features of the object, including the location and dimensions, and instructions 826 may include instructions for projecting (and/or displaying) the image of the object in the location of the object and in the dimensions of the object. Moreover, the instructions 826 may include calibrating a projector with respect to a camera to, for example, identify the coordinates of such object in its own coordinate system. The storage medium 820 may include additional instructions to display the image of the object based on its detected coordinates (e.g., physical location and dimensions) of the object.

Figure 9:
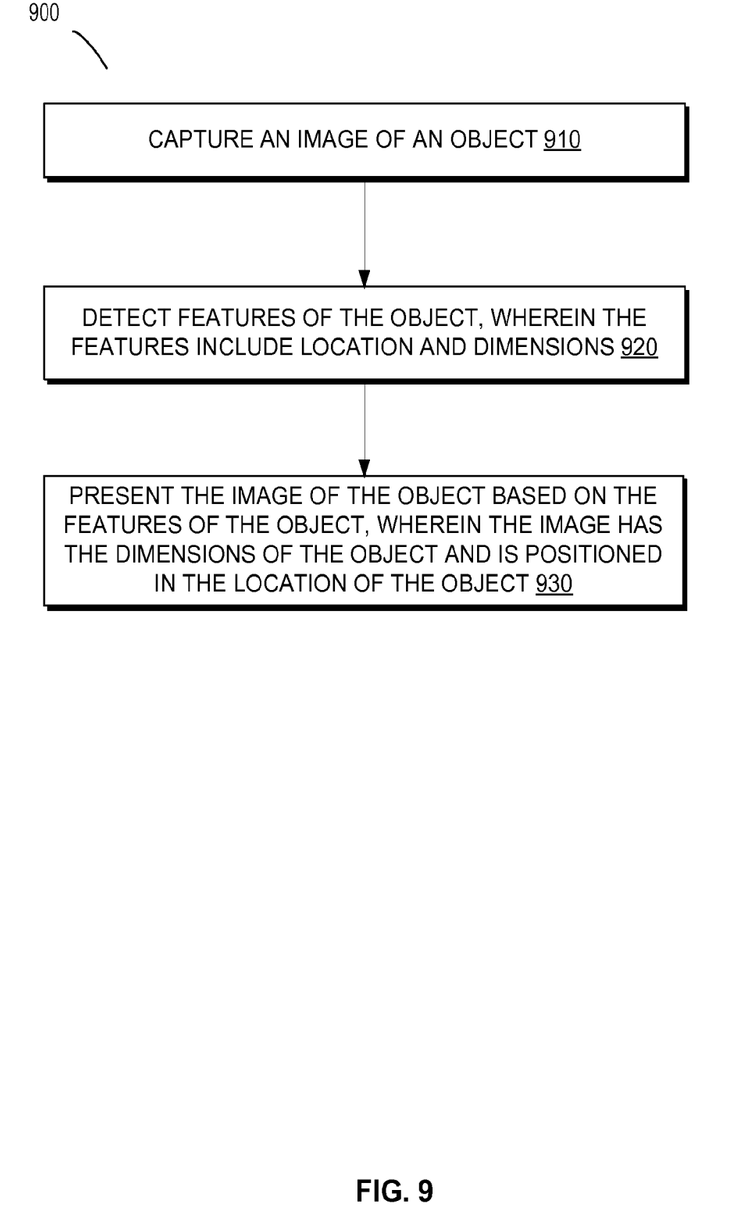
FIG. 9 is a flow diagram depicting steps to implement an example.

Turning now to the operation of the system 100, FIG. 9 is a flowchart of an example method 900 in accordance with an example implementation. It should be readily apparent that the processes depicted in FIG. 9 represent generalized illustrations, and that other processes may be added or the Illustrated processes may be removed, modified, or rearranged in many ways. Further, it should be understood that the processes may represent executable instructions stored on memory that may cause a processing device to respond, to perform actions, to change states, and/or to make decisions, for instance. Thus, the described processes may be implemented as executable instructions and/or operations provided by a memory associated with the computing device 100.

The illustrated process 900 begins at block 910. At 910, an image of an object is captured. In particular, this process may comprise using a sensor, such as a camera to capture a digital image of a physical object placed on a surface in the field of view of the camera. The object may be a 3D object, such as a cube, or it may be a 2D object, such a hardcopy of a photograph. At 920, the system detects features of the object. In one implementation, such features may include location of the object (e.g., coordinates) and size of the object (e.g., dimensions). At block 930, digital image of the object is presented based on the features of the object. More specifically, the digital image of the object is projected and/or displayed in the same location as the physical object. Further, the size of the image of the object matches the size of the physical object. Accordingly, when presented, the digital image of the object overlaps the physical object. In one implementation, the image may be presented through the projector projecting the image on a surface. In such implementation, the physical object is located on the surface. In another implementation, the image may be displayed through a display unit on a display screen. In such implementation, the physical object is located on the display screen.

Although the flowchart of FIG. 9 shows a specific order of performance of certain functionalities, method 900 is not limited to that order. For example, the functionalities shown in succession in the flowchart may be performed in a different order, may be executed concurrently or with partial concurrence, or a combination thereof. In some examples, features and functionalities described herein in relation to FIG. 9 may be provided in combination with features and functionalities described herein in relation to any of FIGS. 1-8.

In the manner described, through use of a computer system 100 in accordance with the principles disclosed herein, the physical object (e.g., object 40) may be scanned thereby creating a digital version of the physical object for viewing and/or manipulation on a display surface of a computing device (e.g., display 152 and/or surface 202). Further, through use of a computer system 100 in accordance with the principles disclosed herein, a digital shared workstation for remotely positioned users may be created wherein physical content may be scanned, digitized, and shared among all concurrent users of the digital collaboration workstation, and user interaction with the digital content and/or physical objection is visible by all participants.

While device 150 has been described as an al-in-one computer, it should be appreciated that in other examples, device 150 may further employ the use of more traditional user input devices such as, for example, a keyboard and a mouse. In addition, while sensors 164a. 164b, 164c. 164d within bundle 164 have been described as each representing a single sensor or camera, it should be appreciated that each of the sensors 164a, 164b, 164c, 164d may each include multiple sensors or cameras while still complying with the principles described herein. Further, while top 160 has been described herein as a cantilevered top, it should be appreciated that in other examples, top 160 may be supported at more than one point and is thus may not be cantilevered while still complying with the principles disclosed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    a camera to capture a digital image of an object positioned in a location within a field of view of the camera;
    a projector unit, communicatively coupled to the camera, to project the digital image in the location of the object, wherein a size of the digital image matches a size of the object;
    a plurality of sensors; and
    a calibration module to perform calibration between the plurality of sensors using a three-dimensional (3 D)-to-two-dimensional (2D) mapping that maps between 3D coordinates of a first sensor of the plurality of sensors and 2D coordinates of a second sensor of the plurality of sensors.

2. The system of claim 1, wherein the projector unit is calibrated with respect to the camera.

3. The system of claim 1, further comprising a computing device to cause the camera to scan the object to produce the digital image and then to cause the projector unit to project the digital image back on the object, wherein the digital image and the object overlap.

4. The system of claim 1, wherein the plurality of sensors comprise a depth detection sensor.

5. The system of claim 1, further comprising a touch sensitive mat, wherein the object is located on the touch sensitive mat, and the digital image is projected on the touch sensitive mat in the same location as the object.

6. The system of claim 1, wherein the camera is to capture the digital image of the object placed on a mat, and the plurality of sensors comprise a sensor to track movement of an input object moved across the mat, the input object comprising at least one from among a stylus and a user's finger.

7. The system of claim 1, further comprising a computing device, wherein the projector unit comprises a base and a mounting member rotatably attached to the computing device.

8. The system of claim 1, further comprising an all-in-one computer communicatively coupled to the camera and the projector unit.

9. The system of claim 8, wherein the all-in-one computer comprises the calibration module, the calibration module to calibrate the projector unit with respect to the camera.

10. The system of claim 8, wherein the all-in-one computer stores mapping information relating to mappings between the camera and the projector unit in a common coordinate system.

11. The system of claim 10, wherein the calibration module is to calibrate the camera and the projector unit using the mapping information.

12. A method, comprising:
    receiving, from a sensor of a plurality of sensors, an image of an object on a surface;
    detecting features of the object, the features including a location and dimensions;
    presenting the image on the surface based on the features of the object, wherein dimensions of the image match the dimensions of the object, and a location of the image overlaps with the location of the object on the surface; and
    performing calibration between the plurality of sensors using a three-dimensional (3D)-to-two-dimensional (2D) mapping that maps between 3D coordinates of a first sensor of the plurality of sensors and 2D coordinates of a second sensor of the plurality of sensors.

13. The method of claim 12, wherein presenting the image on the surface based on the features of the object comprises instructing a projector to project the image on the surface based on the features of the object.

14. The method of claim 12, wherein presenting the image on the surface based on the features of the object comprises instructing a display unit to display the image of the object based on the features of the object, wherein the surface is the display screen of the display unit.

15. The method of claim 12, wherein receiving the image comprises receiving the image from a camera that captures the digital image of the object placed on a mat, and the plurality of sensors comprise a sensor to track movement of an input object moved across the mat, the input object comprising at least one from among a stylus and a user's finger.

16. A non-transitory machine-readable storage medium comprising instructions executable by a processing resource of a computing system, the instructions executable to:
    calibrate a camera with respect to a projector unit, the camera being part of a plurality of sensors;
    receive an image of an object positioned in a location within a field of view of the camera;
    provide the image to be presented in the location of the object, wherein size of the image is same as the object; and
    perform a calibration between the plurality of sensors using a three-dimensional (3D)-to-two-dimensional (2D) mapping that maps between 3D coordinates of a first sensor of the plurality of sensors and 2D coordinates of a second sensor of the plurality of sensors.

17. The non-transitory machine-readable storage medium of claim 16, further comprising instructions executable to:
    map coordinates of the camera to a common coordinate space; and
    derive a mapping between coordinates in a coordinate space of a projector that provides the image and the common coordinate space based on the mapped coordinates and the coordinates in the coordinate space of the projector.

* * * * *

UNITED STATES PATENT AND TRADEMARK OFFICE
CERTIFICATE OF CORRECTION

PATENT NO. : 10,168,833 B2  
APPLICATION NO. : 15/508373  
DATED : January 1, 2019  
INVENTOR(S) : David Bradley Short et al.

Page 1 of 1

It is certified that error appears in the above-identified patent and that said Letters Patent is hereby corrected as shown below:

In the Claims

In Column 13, Claim 1, Line 11, delete "(3 D)" and insert -- (3D) --, therefor.

Signed and Sealed this  
Ninth Day of April, 2019

Andrei Iancu  
*Director of the United States Patent and Trademark Office*